(12) United States Patent
Jang et al.

(10) Patent No.: US 8,587,887 B2
(45) Date of Patent: Nov. 19, 2013

(54) COLOR FILTER SUBSTRATE AND METHOD OF MANUFACTURING THE SAME

(71) Applicant: Samsung Display Co., Ltd., Yongin (KR)

(72) Inventors: Chang-Soon Jang, Seoul (KR); Jin-Seuk Kim, Daejeon (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/679,686

(22) Filed: Nov. 16, 2012

(65) Prior Publication Data
US 2013/0077185 A1 Mar. 28, 2013

Related U.S. Application Data

(63) Continuation of application No. 12/504,440, filed on Jul. 16, 2009, now Pat. No. 8,335,046.

(30) Foreign Application Priority Data

Jan. 14, 2009 (KR) .................. 10-2009-0002837

(51) Int. Cl.
*G02B 5/22* (2006.01)
*G03F 1/00* (2012.01)
*G02F 1/1335* (2006.01)

(52) U.S. Cl.
USPC ................ 359/891; 430/7; 349/106

(58) Field of Classification Search
None
See application file for complete search history.

(56) References Cited

U.S. PATENT DOCUMENTS

| | | | |
|---|---|---|---|
| 7,755,719 B2 | 7/2010 | Katagami et al. | |
| 2002/0196393 A1* | 12/2002 | Tashiro et al. | 349/106 |
| 2007/0121039 A1* | 5/2007 | Tago et al. | 349/114 |
| 2008/0186454 A1 | 8/2008 | Hsu et al. | |

* cited by examiner

*Primary Examiner* — Jade R Chwasz
(74) *Attorney, Agent, or Firm* — Innovation Counsel LLP

(57) ABSTRACT

A color filter substrate includes a plurality of color filters and a first dummy pattern. The color filters are formed in a display area. The color filters include a plurality of colors. The first dummy pattern is formed in a peripheral area surrounding the display area. The first dummy pattern has a color identical to one of the colors. An edge portion of the first dummy pattern corresponding to an apex of the display area is rounded. Therefore, the reliability of a color filter manufacturing process may be improved, the reliability of the color filter may be improved, and the generation of stain defects having a radial shape may be prevented, so that display quality may be improved.

11 Claims, 12 Drawing Sheets

COLOR FILTER SUBSTRATE AND METHOD OF MANUFACTURING THE SAME

PRIORITY STATEMENT

This is a continuation of U.S. patent application Ser. No. 12/504,440, filed Jul. 16, 2009, which application claims priority under 35 U.S.C. §119 to Korean Patent Application No. 10-2009-0002837, filed on Jan. 14, 2009 in the Korean Intellectual Property Office (KIPO), where the contents of each of said applications are herein incorporated by reference in their entireties.

BACKGROUND OF THE INVENTION

1. Field of the Invention

Example embodiments of the present invention relate to a color filter substrate and a method of manufacturing the color filter substrate. More particularly, example embodiments of the present invention relate to a color filter substrate used in small-sized and medium-sized liquid crystal display (LCD) devices and a method of manufacturing the color filter substrate.

2. Description of the Related Art

Generally, a liquid crystal display (LCD) panel includes a first substrate, a second substrate facing the first substrate, and a liquid crystal layer interposed between the first and second substrates. The first substrate includes a plurality of switching elements for driving respective pixel areas. The second substrate includes a plurality of color filters. The LCD panel may control light transmittance by applying a voltage to the liquid crystal layer, and the LCD panel may display a color image by mixing colors transmitted through the color filters. For example, the LCD panel may include color filters including red, green, and blue colors. The LCD panel may display a variety of colors by mixing the red, green, and blue colors.

The second substrate may be manufactured by forming a black matrix pattern on a glass substrate on which each of the pixels are divided to have open areas corresponding to the pixels, forming the color filters on the glass substrate on which the black matrix pattern is formed, and forming a common electrode on the color filters. Each of the color filters may be formed by forming a color photoresist layer including a pigment for displaying a color and patterning the color photoresist layer. The color photoresist layer may be formed through a spin-coating process and/or a slit-coating process using a slit mask.

In order to form a plurality of color filters displaying colors different from each other, a first color filter is formed by patterning a first color photoresist layer, a second color photoresist layer is formed on a glass substrate on which the first color filter is formed, and a second color filter is formed by patterning the second color photoresist layer. Color filters displaying "n" number colors different from each other may be manufactured by repeating the processes.

However, when the second color photoresist layer is formed by using the spin-coating process, the first color filters formed in a display area of the glass substrate serves as a barrier of the second color photoresist layer, so that the second color photoresist layer is not uniformly formed on the entire surface of the glass substrate. Since the second color photoresist layer is non-uniformly formed, stain defects of a radial shape may be generated on the glass substrate.

More defects may be generated when a third color photoresist layer is formed after the first and second color filters, rather than the second color photoresist layer being formed after the first color filter is formed.

SUMMARY OF THE INVENTION

Example embodiments of the present invention provide a color filter substrate capable of improving the reliability of a manufacturing process of the color filter substrate and display quality by minimizing the generation of stain defects of a radial shape due to a spin-coating process.

Example embodiments of the present invention also provide a method of manufacturing the above-mentioned color filter substrate.

According to one aspect of the present invention, a color filter substrate includes a plurality of color filters and a first dummy pattern. The color filters are formed in a display area. The color filters include a plurality of colors. The first dummy pattern is formed in a peripheral area surrounding the display area. The first dummy pattern has a color identical to one of the colors. An edge portion of the first dummy pattern corresponding to an apex of the display area is rounded.

In one embodiment, the first dummy pattern may have a looped curve shape surrounding the display area.

In one embodiment, the thickness of the first dummy pattern may be substantially equal to that of the color filters. In another embodiment, the thickness of the first dummy pattern is substantially thinner than that of the color filters. In still another embodiment, the first dummy pattern may have a stepped portion with heights different from each other.

In one embodiment, the color filter substrate may further include a second dummy pattern being disposed in the peripheral area corresponding to a side of the display area. The second dummy pattern may have the colors. The second dummy pattern may include a plurality of color bar patterns having the colors. The second dummy pattern may further include a plurality of color dot patterns having the colors.

In another aspect of the present invention, there is provided a method of manufacturing a color filter substrate. In the method, a first color photoresist layer is formed on a base substrate. A first color filter formed in a display area of the base substrate and a first dummy pattern formed in a peripheral area surrounding the display area are formed by patterning the first color photoresist layer. An edge portion of the first dummy pattern corresponding to an apex of the display area is rounded. A second photoresist layer is formed on the base substrate on which the first color filter and the first dummy pattern are formed. A second color filter is formed in the display area by patterning the second color photoresist layer.

In one embodiment, in forming the first dummy pattern, the first color photoresist layer may be patterned by using a mask including a light transmitting area corresponding to the first dummy pattern, a mask including a slit area corresponding to the first dummy pattern or a mask including a light transmitting area and a slit area corresponding to the first dummy pattern.

In one embodiment, in forming the first dummy pattern, a plurality of first color bar patterns disposed at the peripheral area corresponding to a side of the display area may be formed by patterning the first color photoresist layer.

In one embodiment, in forming the second color filter, second color bar patterns adjacent to each of the first color bar patterns may be formed by patterning the second color photoresist layer.

In one embodiment, in forming the first dummy pattern, a plurality of first color dot patterns may be formed by patterning the first color photoresist layer. In forming the second color filter, second color dot patterns adjacent to each of the first color dot patterns may be formed by patterning the second color photoresist layer.

According to the present invention, a first dummy pattern is formed in a process for forming a first color filter, so that a second color filter may be uniformly formed after the process for forming the first color filter. Therefore, the reliability of a color filter manufacturing process may be improved and the generation of stain defects of a radial shape may be prevented, so that display quality may be improved.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
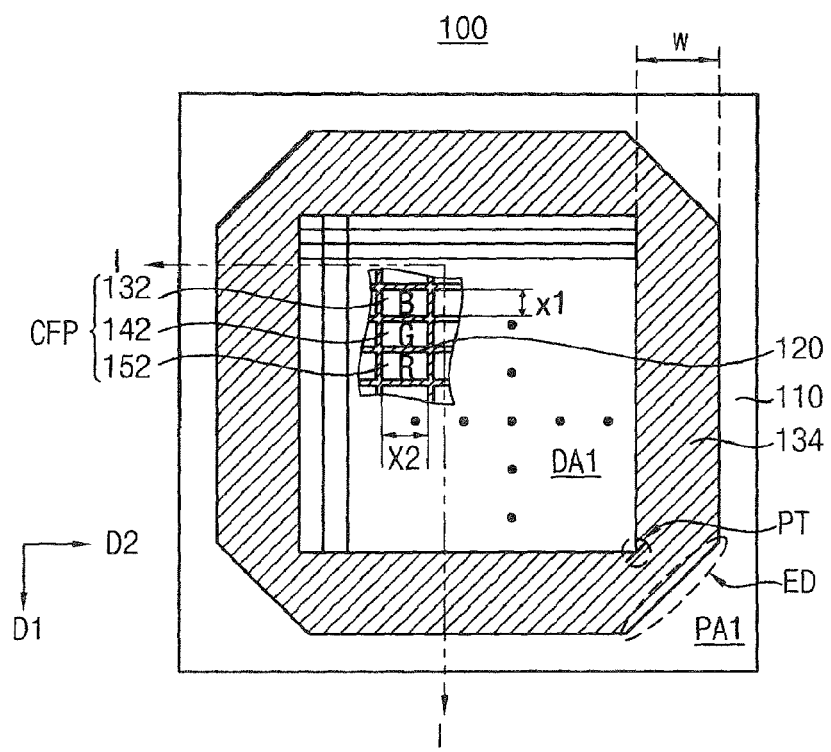
FIG. 1 is a plan view illustrating a color filter substrate according to Embodiment 1 of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Example Embodiment 1

FIG. 1 is a plan view illustrating a color filter substrate according to Example Embodiment 1 of the present invention.

Referring to FIG. 1, a color filter substrate 100 according to Example Embodiment 1 includes a first base substrate 110, a black matrix pattern 120, a color filter pattern CFP and a first dummy pattern 134. The color filter pattern CFP includes a first color filter 132, a second color filter 142 and a third color filter 152.

The black matrix pattern 120 is formed in a first display area DA1 of the first base substrate 110. The black matrix pattern 120 may divide the display area DA1 into a plurality of pixel areas. The first color filter 132, the second color filter 142, and the third color filter 152 are formed in each of the pixel areas. That is, the black matrix pattern 120 may be formed between the first and second color filters 132 and 142, and the black matrix pattern 120 may be formed between the second and third color filters 142 and 152. Alternatively, the black matrix pattern 120 may be formed between the first color filters 132 adjacent to each other.

The color filter pattern CFP is formed in the first display area DA1. The color filter pattern CFP may include the first color filter 132, the second color filter 142, and the third color filter 152 uniformly disposed in a first direction D1 of the first base substrate 110. In the color filter pattern CFP, the first color filters 132 may be disposed in a second direction D2 different from the first direction D1, the second color filters 142 may be disposed in the second direction D2, and the third color filters 152 may be disposed in the second direction D2.

In the present example embodiment, the first color filter 132 may represent a blue color, the second color filter 142 may represent a green color, and the third color filter 152 may represent a red color. Each of the first through third color filters 132, 142 and 152 includes a short side extended in the first direction D1 to have a first length 'x1' and a long side extended in the second direction D2 to have a second length 'x2'. In the present example embodiment, it is described that the color filter pattern CFP includes three colors different from each other such as the red, green, and blue colors. However, the color filter CFP may include a plurality of colors no fewer than two.

The first dummy pattern 134 is formed in a first peripheral area PA1 surrounding the display area DA1 of the first base substrate 110. The first dummy pattern 134 has a color substantially identical to one of the colors in the color filter pattern CFP. In the present example embodiment, the first dummy pattern 134 may have a blue color substantially identical to a color of the first color filter 132. An edge portion ED of the first dummy pattern 134 corresponding to an apex PT of the display area DA1 may be rounded. When the edge portion ED is formed at a right angle, in a process for forming the second color filter 142 and a process for forming the third color filter 152, a color photoresist is not uniformly spin-coated. However, when the edge portion ED is rounded, the color photoresist may be uniformly coated. The first dummy pattern 134 may be formed to surround the color filter pattern 132. In the present example embodiment, the first dummy pattern 134 may be a looped curve shape. A width 'w' of the first dummy pattern 134 may be about 6 times through about 12 times of the first length 'x1' of the first color filter 132. That is, the width 'w' of the first dummy pattern 134 may be about 2 times through about 4 times of the second length 'x2' of the first color filter 132.

In a process for forming the color filter pattern CFP, the second and third color filter patterns 142 and 152 may be uniformly formed on the first base substrate 110 on which the first color filter 132 is formed due to the first dummy pattern 134. Therefore, the first dummy pattern 134 may improve the reliability of a manufacturing process of the second and third color filters 142 and 152.

Figure 2:
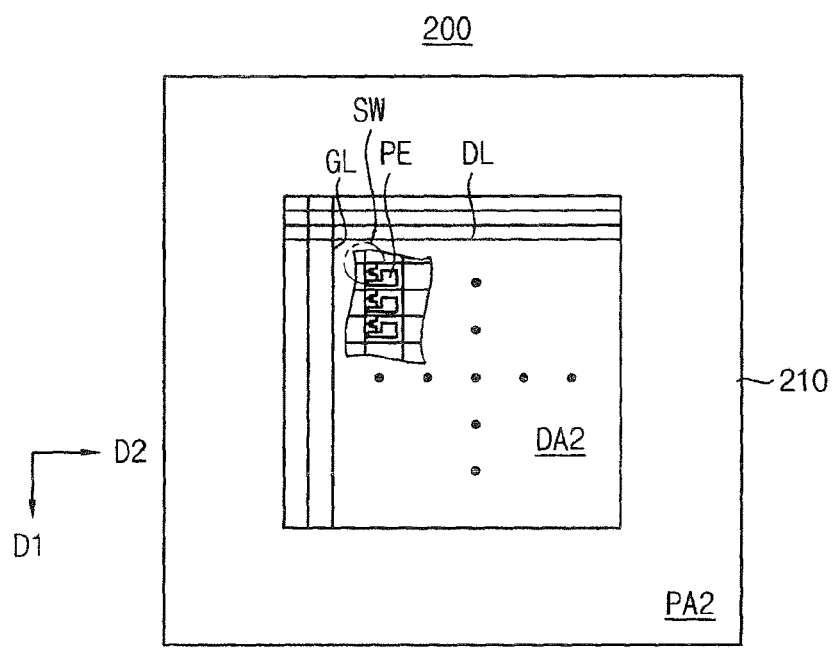
FIG. 2 is a plan view illustrating a display substrate facing the color filter substrate of FIG. 1.

FIG. 2 is a plan view illustrating a display substrate facing the color filter substrate of FIG. 1.

Referring to FIG. 2, a display substrate 200 according to Example Embodiment 1 is a substrate facing the color filter substrate 100. The display substrate 200 includes a second base substrate 210, a gate line GL, a data line DL, a switching element SW and a pixel electrode PE. The data line DL, the switching element SW, and the pixel electrode PE may be formed in a second display area DA2 on the second base substrate 210. The second display area DA2 is an area facing the first display area DA1 when the display substrate 200 is assembled with the color filter substrate 100. A second peripheral area PA2 of the second base substrate 210 surrounds the second display area DA2. A circuit (not shown) may be integrated on the second peripheral area PA2, which is electrically connected to an end portion of the gate line GL and an end portion of the data line DL.

The gate line GL is extended in the first direction D1 to be electrically connected to the switching element SW. The data line DL is extended in the second direction D2 to be electrically connected to the switching element SW. The switching element SW is electrically connected to the pixel electrode PE. The gate line GL and the data line DL may face the black matrix pattern 120. The pixel electrodes PE formed in each of the pixel areas of the second display area DA2 may respectively face the first through third color filters 132, 142, and 152.

Figure 3:
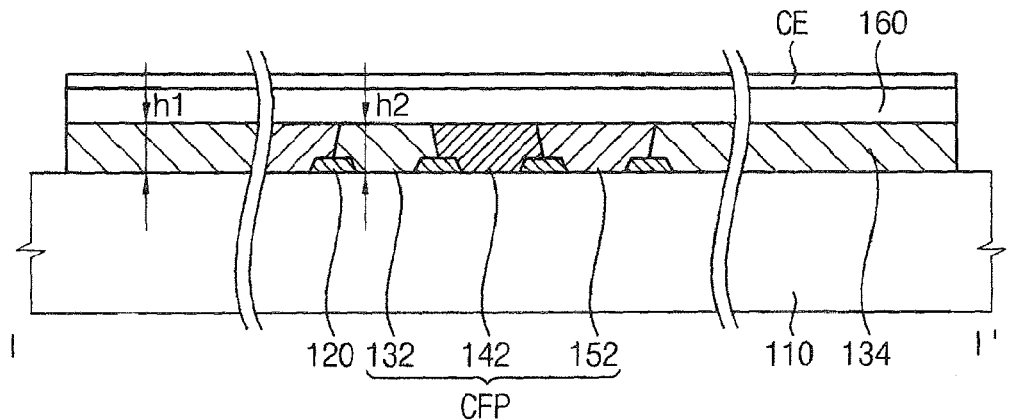
FIG. 3 is a cross-sectional view taken along a line I-I' of FIG. 1.

FIG. 3 is a cross-sectional view taken along a line I-I' of FIG. 1.

Referring to FIG. 3, the color filter substrate 100 according to Example Embodiment 1 may further include an overcoating layer 160 and a common electrode layer CE. Moreover, the color filter substrate 100 may further include an alignment layer (not shown) formed on the common electrode layer CE.

Each of the black matrix pattern 120 and the color filter pattern CFP is formed on the first base substrate 110, respectively. The overcoating layer 160 is formed on the first base substrate 110 on which the black matrix pattern 120 and the color filter pattern CFP are formed. The overcoating layer 160 may be formed in the first display area DA1 and the first peripheral area PA1, respectively. The common electrode layer CE is formed on the first base substrate 110 on which the overcoating layer 160 is formed.

A first thickness 'h1' of the first dummy pattern 134 may be substantially equal to a second thickness 'h2' of the color filter pattern CFP. The first through third color filters 132, 142, and 152 may have substantially the same second thickness 'h2'. The first thickness 'h1' is substantially equal to the second thickness 'h2,' and the first dummy pattern 134 having a predetermined width 'w' is formed in the peripheral area PA1 Therefore, in a process for forming the second color filter 142, the first color filter 132 may not serve as a barrier of a color photoresist for forming the second color filter 142. Moreover, in a process for forming the third color filter 152, the first and second color filters 132 and 142 may not serve as a barrier of a color photoresist for forming the third color filter 152.

Figure 4:
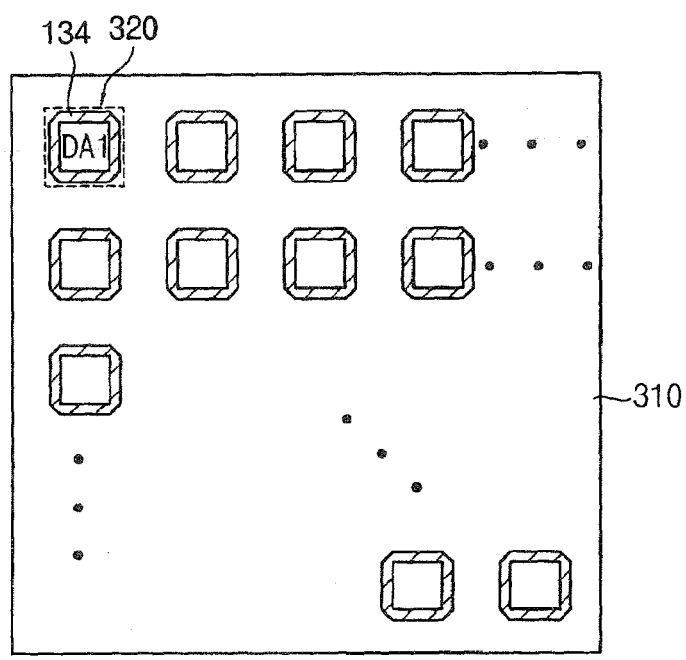
FIG. 4 is a plan view illustrating a mother substrate for describing steps of forming the first dummy pattern.
Figure 5:
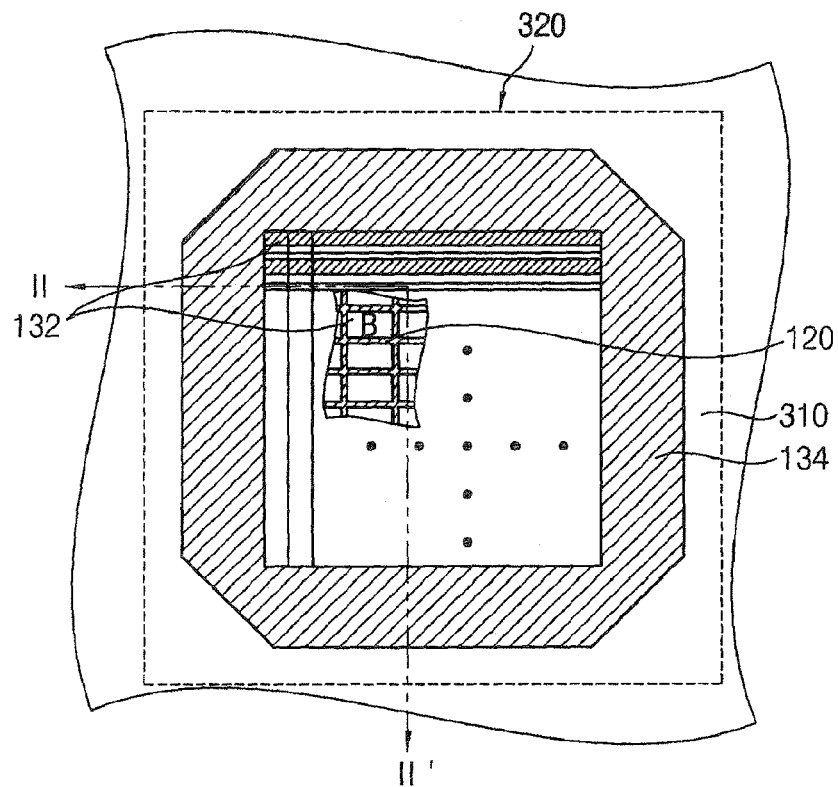
FIG. 5 is an enlarged plan view illustrating a unit cell of FIG. 4.
Figure 6:
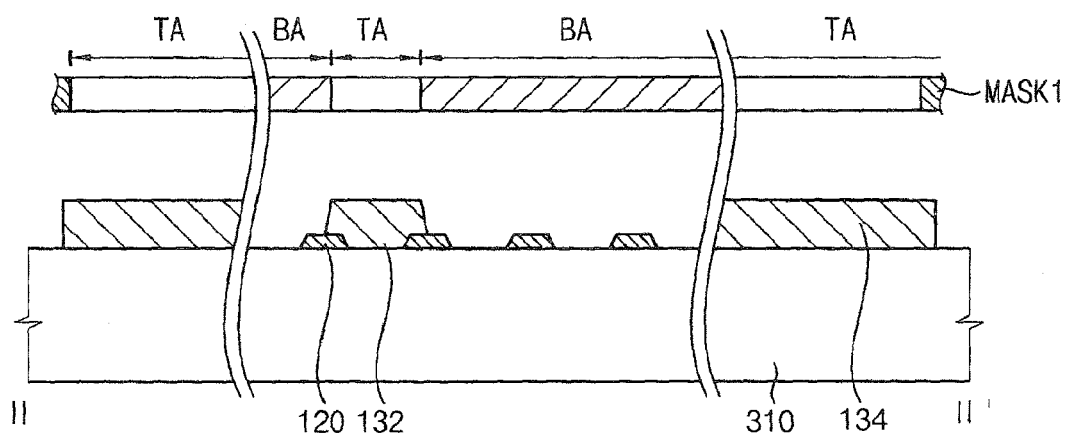
FIG. 6 is a cross-sectional view taken along a line II-II' of FIG. 5.

Hereinafter, a method of manufacturing the color filter substrate illustrated in FIG. 3 will be described with reference to FIGS. 4 to 10. FIGS. 4 to 6 are diagrams illustrating steps of forming the first dummy pattern and the first color filter, and FIGS. 7 to 10 are diagrams illustrating steps of forming the second color filter.

FIG. 4 is a plan view illustrating a mother substrate for describing steps of forming the first dummy pattern.

FIG. 5 is an enlarged plan view illustrating a unit cell of FIG. 4.

Referring to FIGS. 4 and 5, the black matrix pattern 120 is formed on a color filter mother substrate 310 including a plurality of unit cells 320. The black matrix pattern 120 may be formed by printing an organic material or through a photolithography process after forming a metal thin film.

The first color filter 132 and the first dummy pattern 134 are formed on the color filter mother substrate 310 on which the black matrix pattern 120 is formed. The first color filter 132 and the first dummy pattern 134 may be formed in each of the unit cells 320. The first color filter 132 may be formed in an internal area of the unit cell 320 and the first dummy pattern 134 may be formed in an external area surrounding the internal area. The unit cells 320 may be physically divided each other in a case that the color filter mother substrate 310 is cut. The color filter mother substrate 310 is cut with the unit cells 320 as a base unit, so that the color filter substrate 200 may be formed.

The internal area of the unit cell 320 may correspond to the first display area DA1 of the color filter substrate 100 and the external area of the unit cell 320 may correspond to the first peripheral area PA1 of the color filter substrate 100. When the color filter mother substrate 310 includes "n" number unit cells 320, the color filter mother substrate 310 may include n dummy patterns.

FIG. 6 is a cross-sectional view taken along a line II-II' of FIG. 5.

Referring to FIG. 6, a first color photoresist layer (not shown) is formed and the first color photoresist layer is exposed and developed by using a first mask MASK1 disposed on the first color photoresist layer to form the first color filter 132 and the first dummy pattern 134.

The first color photoresist layer may be formed by a spin-coating of a first color photoresist on the first color filter mother substrate 310. For example, the first color photoresist is dropped on a specific area, for example, a central area, of the color filter mother substrate 310. The first color photoresist dropped on the color filter mother substrate 310 is coated on a front surface of the color filter mother substrate 310 by a spin-coating, so that the first color photoresist layer may be formed.

The first mask MASK1 is disposed on the color filter mother substrate 310 on which the first color photoresist layer is formed, and light is irradiated on the first mask MASK1. The first mask MASK1 includes a light transmitting area TA and a light blocking area BA. The first color photoresist layer on which the light is irradiated is developed by a developer, and the first color filter 132 and the first dummy pattern 134 may be formed. A first area of the first color photoresist layer on which the light is irradiated corresponding to the light transmitting area TA is not eliminated by the developer. That is, the first area of the first color photoresist layer on which the light is irradiated corresponding to the light transmitting area TA remains on the color filter mother substrate 310. A second area of the first color photoresist layer on which the light is blocked corresponding to the light blocking area BA is dissolved and eliminated by the developer. A second thickness h2 of the first color filter 132 may be substantially equal to a first thickness h1 of the first dummy pattern 134, as shown in FIG. 3.

Figure 7:
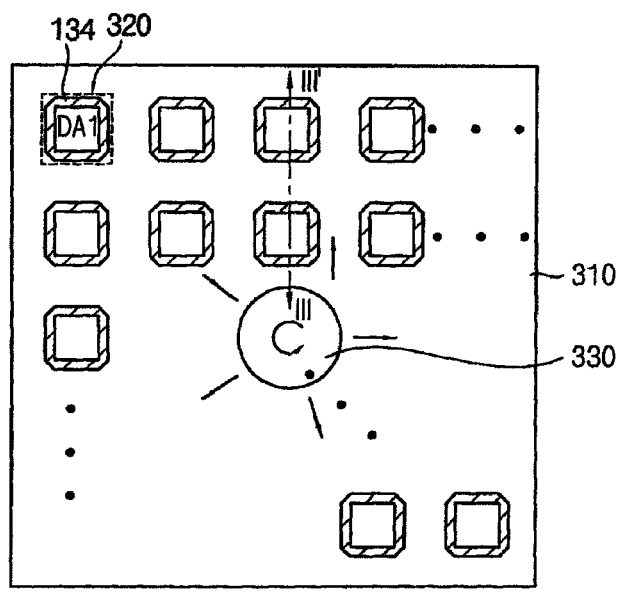
FIG. 7 is a plan view illustrating a mother substrate for describing steps of forming the second color photoresist layer.
Figure 8:
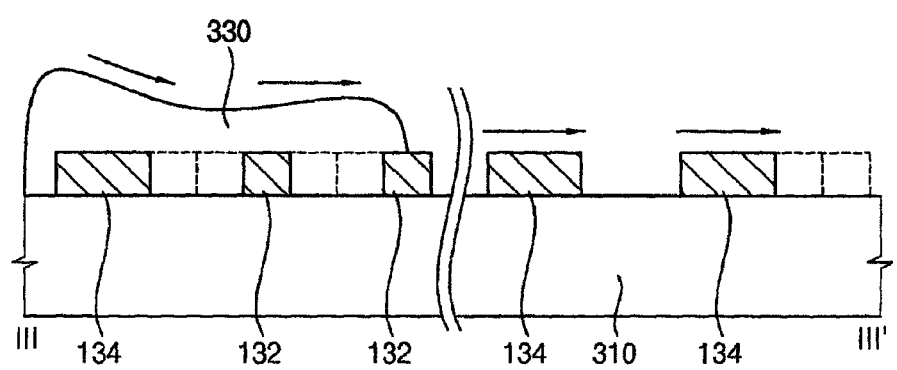
FIG. 8 is a cross-sectional view taken along a line III-III' of FIG. 7.

FIG. 7 is a plan view illustrating a mother substrate for describing steps of forming the second color photoresist layer. FIG. 8 is a cross-sectional view taken along a line III-III' of FIG. 7.

Referring to FIG. 7, a second color photoresist 330 is dropped on the color filter mother substrate 310 on which the first color filter 132 and the first dummy pattern 134 are formed. The second color photoresist 330 dropped on the color filter mother substrate 310 is uniformly distributed on the front surface of the color filter mother substrate 310 by the spin-coating.

The first dummy pattern 134 may minimize a step difference, between a surface of the color filter mother substrate 310 and the first color filter 132. A step difference between the internal area of the unit cell 320 and the external area of the unit cell 320 may be minimized by the first dummy pattern 134. Moreover, a step difference between unit cells 320 adjacent to each other may be minimized by the first dummy pattern 134.

Referring to FIG. 8, when the second color photoresist 330 is coated, the second color photoresist 330 flows into the internal area through on the first dummy pattern 134. The second color photoresist 330 flows into the internal areas between the first dummy pattern 134 having a thickness substantially equal to the thickness of the first color filter 132 and the first color filter 132. Therefore, the second color photoresist 330 is uniformly distributed in the internal areas. Moreover, the second color photoresist 330 passing through the internal areas easily flows on the first dummy pattern 134 formed in a movement direction of the second color photoresist 330. The second color photoresist 330 flows on the first color filter 132 and flows on the first dummy pattern 134 having the thickness substantially equal to the thickness of the first color filter 132, so that the second color photoresist 330 may be uniformly distributed on the color filter mother substrate 310.

The first dummy pattern 134 is formed between the unit cells adjacent to each other, so that the second color photoresist 330 may be uniformly distributed on the front surface of the color filter mother substrate 310. The first dummy pattern 134 may cause the second color photoresist 320 in a shaded portion toward the unit cell 320 to easily flow into the internal area of the unit cell 320.

Figure 9:
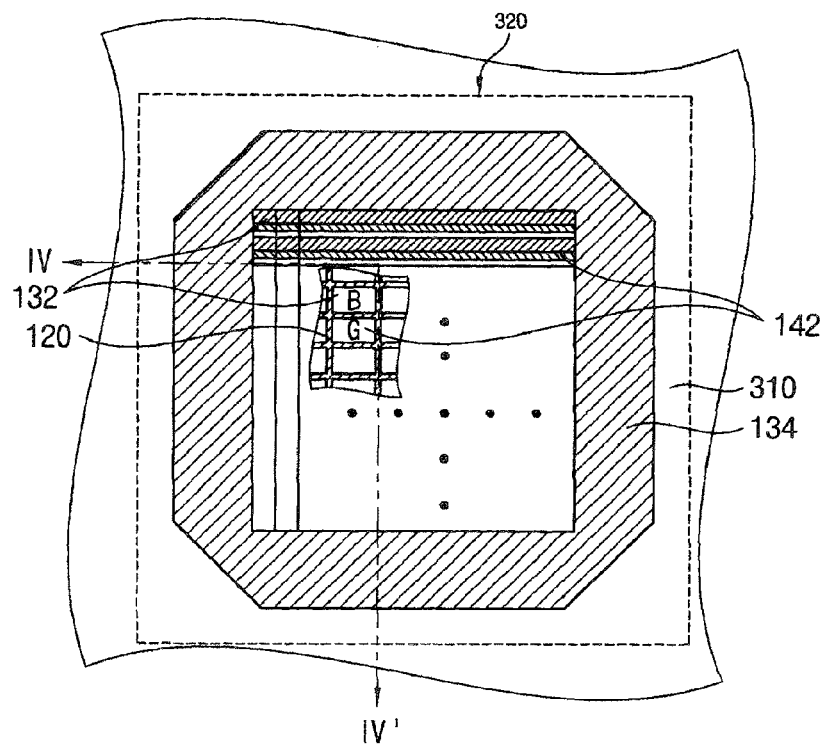
FIG. 9 is a plan view illustrating the mother substrate for describing steps of forming the second color filter.
Figure 10:
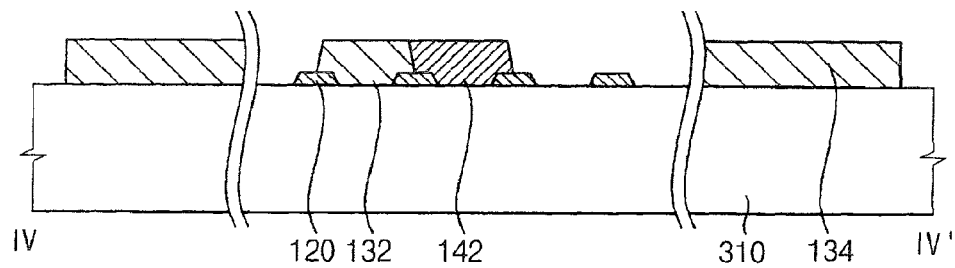
FIG. 10 is a cross-sectional view taken along a line IV-IV' of FIG. 9.

FIG. 9 is a plan view illustrating the mother substrate for describing steps of forming the second color filter. FIG. 10 is a cross-sectional view taken along a line IV-IV' of FIG. 9.

Referring to FIGS. 9 and 10, the second color filter 142 is formed by patterning the second color photoresist layer. The second color filter 142 may be formed by exposing and developing the second color photoresist layer. The second color photoresist layer is uniformly formed on the color filter mother substrate 310, so that the second color filter 142 also may be uniformly formed on the color filter mother substrate 310. Therefore, the reliability of manufacturing the second color filter 142 may be improved.

Referring to FIG. 3 again, a third color photoresist layer is formed on the color filter mother substrate 310 on which the first dummy pattern 134, the first color filter 132, and the second color filter 142 are formed. The third color filter 152 may be formed by exposing and developing the third color photoresist layer.

When the third color photoresist layer is formed, the first dummy pattern 134 may prevent the first color filter 132 and the second color filter 142 from serving as a barrier of the third color photoresist. A case in which the first dummy pattern 134 prevents the first and second color filters 132 and 142 from serving as the barrier of the third color photoresist is substantially the same as a case in which the first dummy pattern 134 prevents the first color filter 132 from serving as the barrier of the second color photoresist. Thus, a detailed description will be omitted.

The overcoating layer 160 is formed on the color filter mother substrate 310 on which the first to third color filters 132, 142, and 152 are formed. The overcoating layer 160 may flat a surface of the color filter mother substrate 310. The overcoating layer 160 may be formed with acrylic resin.

The common electrode layer CE is formed on the overcoating layer 160. The common electrode layer CE may be formed with indium tin oxide (ITO), indium zinc oxide (IZO), etc.

The color filter mother substrate 310 on which the common electrode layer CE is formed is cut with the unit cell as the base unit. Therefore, the color filter substrate 100 may be formed.

According to the present example embodiment, in a process for forming the first color filter 132, the first dummy pattern 134 is formed, so that the color filter 142 and the third color filter 152 may be uniformly formed. Therefore, the reliability of a color filter manufacturing process may be improved, the reliability of the color filter may be improved, and the generation of stain defects having a radial shape may be prevented, so that display quality may be improved.

Example Embodiment 2

Figure 11:
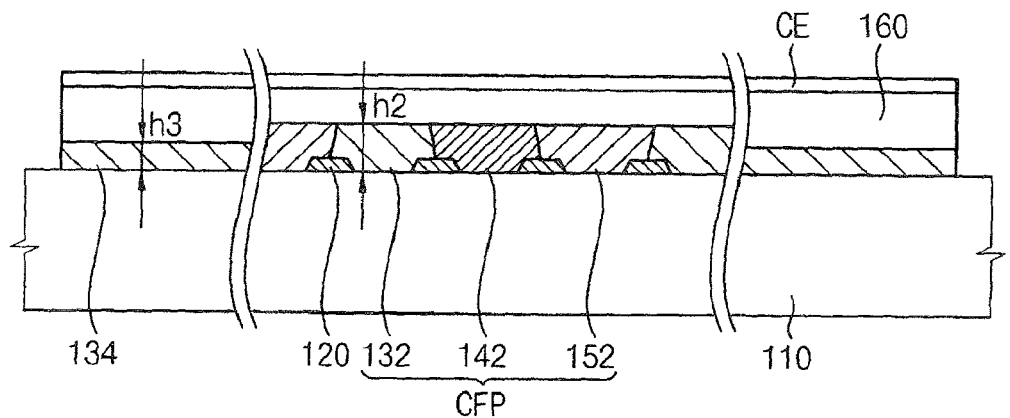
FIG. 11 is a cross-sectional view illustrating a color filter substrate according to Embodiment 2 of the present invention.

FIG. 11 is a cross-sectional view illustrating a color filter substrate according to Example Embodiment 2 of the present invention.

The color filter substrate illustrated in FIG. 11 is substantially the same as the color filter substrate illustrated in FIG. 3 according to Example Embodiment 1 except for at least the thickness of the first dummy pattern. Thus, identical reference numerals are used in FIG. 11 to refer to components that are the same or like those shown in FIG. 1, and thus, a detailed description will be omitted.

Referring to FIG. 11, the color filter substrate 100 according to Example Embodiment 2 includes a black matrix pattern 120, a color filter pattern CFP, a first dummy pattern 134, an overcoating layer 160, and a common electrode layer CE formed on a first base substrate 110. The color filter pattern CFP includes a first color filter 132, a second color filter 142, and a third color filter 152 The first dummy pattern 134 may be formed by patterning a first color photoresist layer substantially the same as the first color filter 132.

A third thickness h3 of the first dummy pattern 134 may be thinner than a second thickness h2 of the color filter pattern CFP. The second color photoresist for forming the second color filter 142 flows on the first dummy pattern 134 and flows into a first display area DA1 of the first base substrate 110, so that the first dummy pattern 134 may be used as a buffer member. Moreover, the second color photoresist may flow on the first color filter 132 and flow on the first dummy pattern 134 disposed at a movement direction of the second color photoresist. That is, the first dummy pattern 134 may minimize a step difference between the first base substrate 110 and the first color filter 132.

Therefore, in a process for forming the second color filter 142, the first color filter 132 may not serve as a barrier of a color photoresist for forming the second color filter 142. Moreover, in a process for forming the third color filter 152, the first and second color filters 132 and 142 may not serve as a barrier of a color photoresist for forming the third color filter 152.

Hereinafter, a method of manufacturing the color filter substrate according to Example Embodiment 2 will be described with reference to FIG. 12 and FIGS. 7 to 10. For convenience of description, in FIGS. 12 to 21, the color filter mother substrate 310 of FIG. 4 may be illustrated as the first base substrate 110 of the color filter substrate 100.

Figure 12:
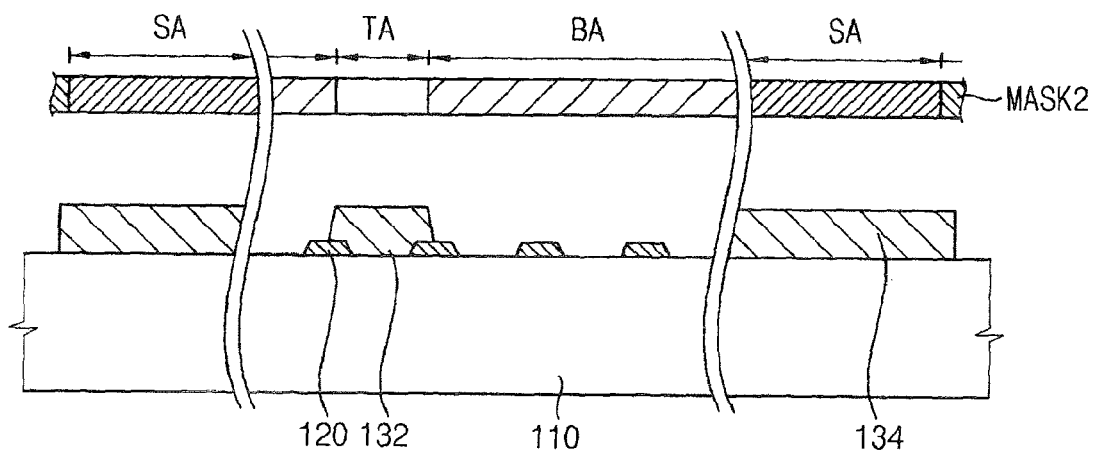
FIG. 12 is a cross-sectional view illustrating the color filter substrate for describing steps of forming the first dummy pattern of FIG. 11.

FIG. 12 is a cross-sectional view illustrating the color filter substrate for describing steps of forming the first dummy pattern of FIG. 11.

Referring to FIG. 12, a first color photoresist layer (not shown) is formed and the first color photoresist layer exposed and developed by using a second mask MASK2 to form the first color filter 132 and the first dummy pattern 134.

The second mask MASK2 is disposed on the color filter mother substrate 110 on which the first color photoresist layer is formed, and light is irradiated on the second mask MASK2. The second mask MASK2 includes a light transmitting area TA, a light blocking area BA, and a slit area SA having a plurality of slits. The first color photoresist layer on which the light is irradiated is developed by a developer, and the first color filter 132 and the first dummy pattern 134 may be formed.

For example, an area of the first color photoresist layer on which the light is irradiated corresponding to the light blocking area BA is eliminated by the developer, and areas of the first color photoresist layer on which the light is irradiated corresponding to the light transmitting area TA and the slit area SA remain.

The area of the first color photoresist layer on which the light is irradiated corresponding to the light transmitting area TA is not eliminated and remains on the first base substrate 110. Therefore, the first color filter 132 having the second thickness h2 may be formed. A portion of the first color photoresist layer on which the light is irradiated correspondingly to the slit area SA is eliminated by the developer and a remaining portion of the first color photoresist layer on which the light is irradiated correspondingly to the slit area SA remains on the first base substrate 110. Therefore, the first dummy pattern 134 having the third thickness h3 thinner than the second thickness h2 may be formed.

The first color filter 132 and the first dummy pattern 134 may be formed by using a halftone mask forming a semi-light transmitting area to correspond to the slit area SA.

The second color filter 142 and the third color filter 152 are sequentially formed, the overcoating layer 160 and the common electrode layer CE are formed, so that the color filter substrate 100 according to Example Embodiment 2 may be manufactured.

Steps for forming the second color filter 142, the third color filter 152, the overcoating layer 160 and the common electrode layer CE are substantially the same as the steps described in the method of manufacturing the color filter substrate according to Example Embodiment 1 with reference to FIGS. 7 to 10. Therefore, a detailed description will be omitted.

According to the present example embodiment, the second color filter 142 and the third color filter 152 may be uniformly formed by the first dummy pattern 134. Therefore, the reliability of a color filter manufacturing process may be improved, the reliability of the color filter may be improved, and the generation of stain defects having a radial shape may be prevented, so that display quality may be improved.

Example Embodiment 3

Figure 13:
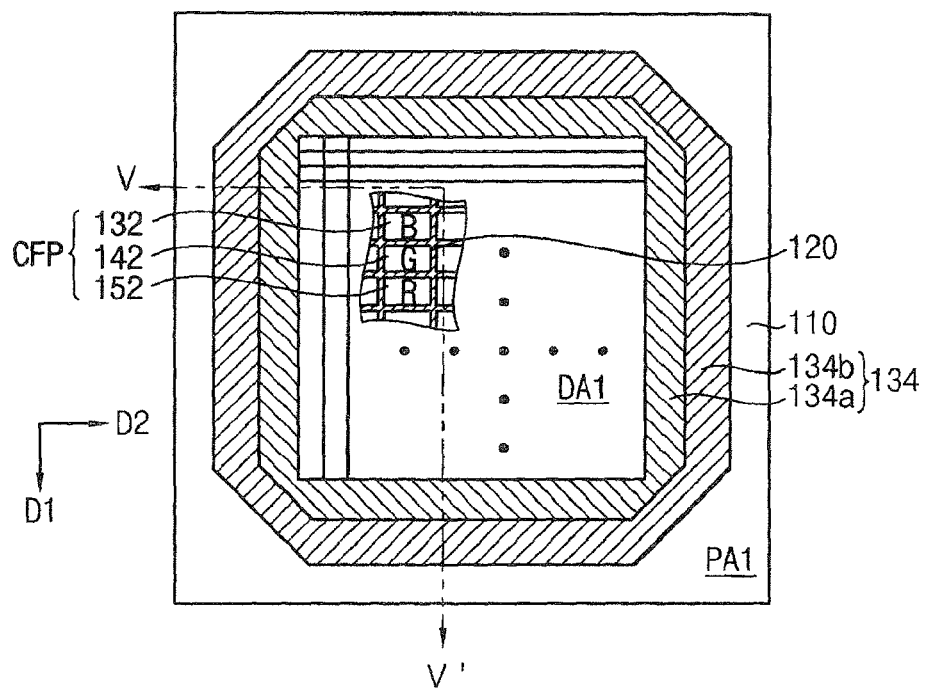
FIG. 13 is a plan view illustrating a color filter substrate according to Embodiment 3 of the present invention.
Figure 14:
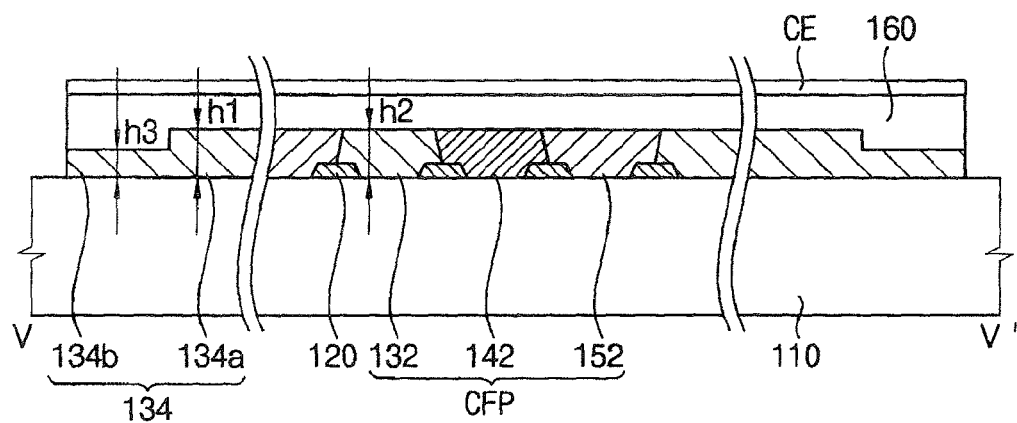
FIG. 14 is a cross-sectional view taken along a line V-V' of FIG. 13.

FIG. 13 is a plan view illustrating a color filter substrate according to Example Embodiment 3 of the present invention. FIG. 14 is a cross-sectional view taken along a line V-V' of FIG. 13.

The color filter substrate illustrated in FIG. 13 and FIG. 14 according to Example Embodiment 3 is substantially the same as the color filter substrate according to Example Embodiment 1 except for least the first dummy pattern. Thus, a detailed description will be omitted.

Referring to FIGS. 13 and 14, the color filter substrate 100 according to Example Embodiment 3 includes a black matrix pattern 120, a color filter pattern CFP, a first dummy pattern 134, an overcoating layer 160 and a common electrode layer CE formed on a first base substrate 110. The color filter pattern CFP includes a first color filter 132, a second color filter 142, and a third color filter 152. The color filter pattern CFP may be formed in a first display area DA1 of the first base substrate 110.

The first dummy pattern 134 may be formed by patterning a first color photoresist layer substantially identical to the first color filter 132. The first dummy pattern 134 may be formed in a first peripheral area PA1 surrounding the first display area DA1. The first dummy pattern 134 may have a stepped portion with heights different from each other. A height of the stepped portion may be gradually decreased from the first display area DA1 toward the first peripheral area PA1. The first dummy pattern may be formed with a step shape. For example, the first dummy pattern may include a first thickness area 134a and a second thickness area 134b. The first thickness area 134a may have a first thickness 'h1' substantially equal to a second thickness 'h2' of the first color filter 132. The first thickness area 134a may be formed in the first peripheral area PA1 contacting to the first display area DA1. The second thickness area 134b may have a third thickness 'h3' thinner than the second thickness 'h2' of the first color filter 132. The second thickness area 134b may be formed at an outline of the first thickness area 134a to surround the first thickness area 134a. For example, the second thickness area 134b may be formed to surround side walls facing side walls of the first thickness area 134a contacting the color filter pattern CFP.

The second color photoresist for forming the second color filter 142 flows on the first dummy pattern 134 and flows into the first display area DA1, so that the first dummy pattern 134 may be used as a buffer member. For example, the second color photoresist may flow into the first thickness area 134a through on the second thickness area 134b and the second color photoresist may enter into the first display area DA1. Moreover, the second color photoresist may flow into the first thickness area 134a of the first dummy pattern 134 disposed at a movement direction of the second color photoresist through on the first color filter 132 and the second color photoresist may step down through the second thickness area 134b. That is, the first dummy pattern 134 having a step shape may minimize a step difference between the first base substrate 110 and the first color filter 132. Therefore, in a process for forming the second color filter 142, the first color filter 132 may not serve as a barrier of a color photoresist for forming the second color filter 142.

In a process for forming the third color filter 152, the first and second color filters 132 and 142 may not serve as a barrier of a color photoresist for forming the third color filter 152 by the first dummy pattern 134.

Hereinafter, a method of manufacturing the color filter substrate according to Example Embodiment 3 will be described with reference to FIG. 15.

Figure 15:
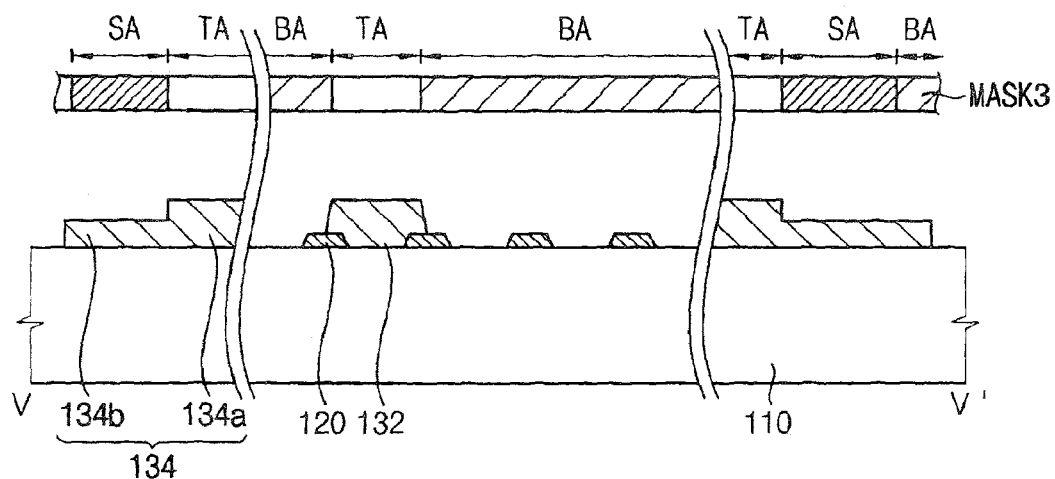
FIG. 15 is a cross-sectional view illustrating the color filter substrate for describing steps of forming the first dummy pattern of FIG. 13.

FIG. 15 is a cross-sectional view illustrating the color filter substrate for describing steps of forming the first dummy pattern of FIG. 13.

Referring to FIG. 15, a first color photoresist layer (not shown) is formed on the first base substrate 110 on which the black matrix pattern 120 is formed and the first color photoresist layer is exposed and developed by using a second mask MASK2 to form the first color filter 132 and the first dummy pattern 134.

A third mask MASK3 is disposed on the first base substrate 110 on which the first color photoresist layer is formed, and light is irradiated on the third mask MASK3. The third mask MASK3 includes a light transmitting area TA transmitting light, a light blocking area BA blocking light and a slit area SA having a plurality of slits.

For example, an area of the first color photoresist layer on which the light is irradiated corresponding to the light blocking area BA is eliminated by the developer, and areas of the first color photoresist layer on which the light is irradiated corresponding to the light transmitting area TA and the slit area SA remain.

The area of the first color photoresist layer on which the light is irradiated corresponding to the light transmitting area TA is not eliminated and remains on the first base substrate 110. The light transmitting area TA may be disposed corresponding to the first color filter 132 and an internal area of the first dummy pattern 134. The internal area of the first dummy pattern 134 may be defined as an area of the first peripheral area PA1 contacting the first display area DA1.

Therefore, the first color filter 132 having the second thickness h2 and the first thickness area 134a of the first dummy pattern having the first thickness h1 may be formed. The first thickness h1 may be substantially equal to the second thickness h2. A portion of the first color photoresist layer on which the light is irradiated corresponding to the slit area SA is eliminated by the developer and a remaining portion of the first color photoresist layer on which the light is irradiated corresponding to the slit area SA remains on the first base substrate 110. The slit area SA may be disposed corresponding to an external area of the first dummy pattern 134. The external area of the first dummy pattern 134 may be defined as an area of the first peripheral area PA1 surrounding the internal area. Therefore, the first dummy pattern 134 having the first thickness area 134a and third thickness h3 thinner than the second thickness h2 of the first color filter 132 may be formed.

The first color filter 132 and the second thickness area 134b of the first dummy pattern 134 may be formed by using a halftone mask forming a semi-light transmitting area to correspond to the slit area SA.

The second color filter 142 and the third color filter 152 are sequentially formed, the overcoating layer 160 and the common electrode layer CE are formed, so that the color filter substrate 100 according to Example Embodiment 3 may be manufactured.

Steps for forming the second color filter 142, the third color filter 152, the overcoating layer 160 and the common electrode layer CE are substantially the same as the steps described in the method of manufacturing the color filter substrate according to Example Embodiment 1 with reference to FIGS. 7 to 10. Thus, a detailed description will be omitted.

According to the present example embodiment, the second color filter 142 and the third color filter 152 may be uniformly formed by the first dummy pattern 134. Therefore, the reliability of a color filter manufacturing process may be improved, the reliability of the color filter may be improved, and the generation of stain defects having a radial shape may be prevented, so that display quality may be improved.

Example Embodiment 4

Figure 16:
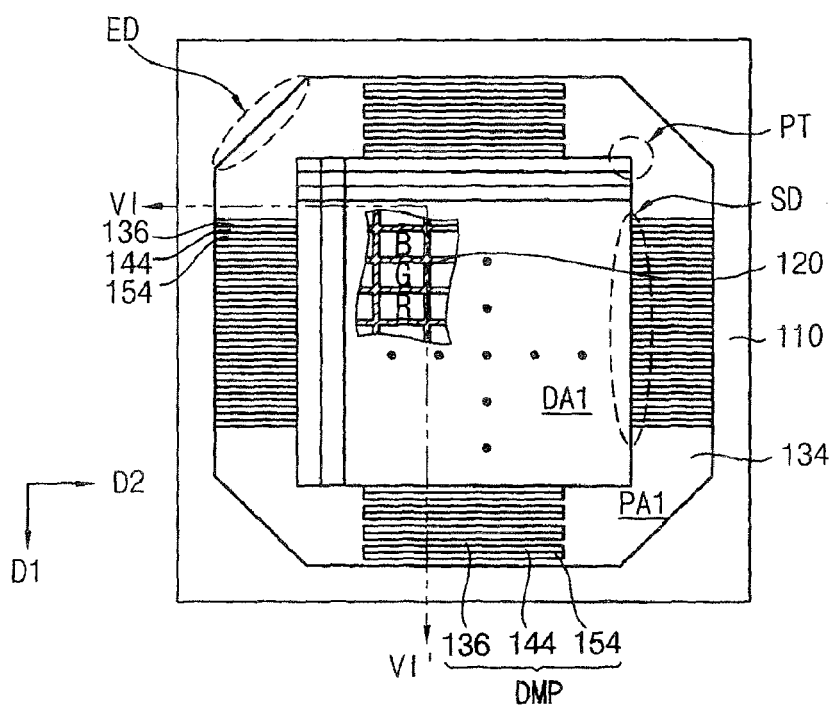
FIG. 16 is a plan view illustrating a color filter substrate according to Embodiment 4 of the present invention.
Figure 17:
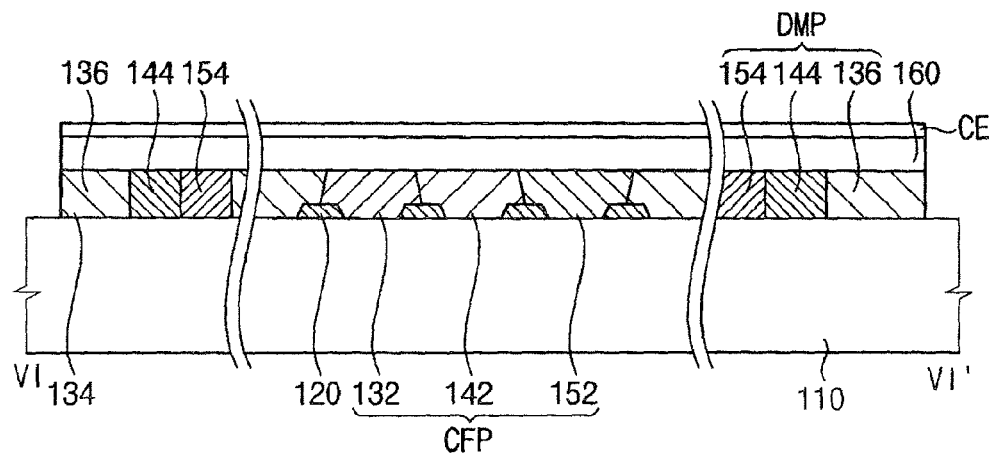
FIG. 17 is a cross-sectional view taken along a line VI-VI' of FIG. 16.

FIG. 16 is a plan view illustrating a color filter substrate according to Example Embodiment 4 of the present invention. FIG. 17 is a cross-sectional view taken along a line VI-VI' of FIG. 16.

The color filter substrate illustrated in FIG. 13 and FIG. 14 according to Example Embodiment 4 is substantially the same as the color filter substrate according to Example Embodiment 1 except for at least the first dummy pattern 134 and the second dummy pattern DMP. Thus, a detailed description will be omitted.

Referring to FIGS. 16 and 17, the color filter substrate 100 according to Example Embodiment 4 includes a first base substrate 110, a black matrix pattern 120, a color filter pattern CFP including a first color filter 132, a second color filter 142 and a third color filter 152, a first dummy pattern 134 and a second dummy pattern DMP. The color filter substrate 100 may further include an overcoating layer 160 and a common electrode layer CE. Moreover, the color filter substrate 100 may further include an alignment layer (not shown) formed on the common electrode layer CE. The black matrix pattern 120 and the color filter pattern CFP are formed in a first display area DA1 of the first base substrate 110.

The first dummy pattern 134 is formed in a first peripheral area PA1 surrounding the display area DA1 of the first base substrate 110. The first dummy pattern 134 has a color substantially the same as one color of the colors in the color filter pattern CFP. An edge portion ED of the first dummy pattern 134 corresponding to an apex PT of the display area DA1 may be rounded. The thickness of the first dummy pattern 134 may be substantially equal to the thickness of the color filter pattern CFP. The thickness of the first dummy pattern 134 may be thinner than the thickness of the color filter pattern CFP. The first dummy pattern 134 may include a first thickness area 134a and a second thickness area 134b thinner than the first thickness area 134a.

The second dummy pattern DMP is formed in the first peripheral area PA1 corresponding to a side of the first display area DA1, and the second dummy pattern DMP has a color substantially the same as the color of the color filter pattern CFP. The thickness of the second dummy pattern DMP may be substantially equal to the thickness of the color filter pattern CFP or thinner than the thickness of the color filter pattern CFP. The thickness of the second dummy pattern DMP may be substantially equal to the thickness of the first dummy pattern 134 or thicker than the thickness of the first dummy pattern 134. The second dummy pattern DMP may include first color bar patterns 136, second color bar patterns 144 and third color bar patterns 154. The first to third color bar patterns 136, 144, and 154 may be repeatedly disposed on the first base substrate 110 in a first direction D1. Each of the first to third color bar patterns 136, 144, and 154 may be extended in a second direction different from the first direction D1. The first color bar patterns 136 may be formed by patterning a color photoresist layer forming the first dummy pattern 134. The second color bar patterns 144 may be formed by patterning a color photoresist layer forming the second color filter 142. The third color bar patterns 154 may be formed by patterning a color photoresist layer forming the third color filter 152.

In a process for forming the color filter pattern CFP, the second and third color filters 142 and 152 may be uniformly formed on the first base substrate 110 on which the first color filter 132 is formed. Therefore, the first dummy pattern 134 may increase the reliability of manufacturing the second and third color filters 142 and 152.

Hereinafter, a method of manufacturing the color filter substrate according to Example Embodiment 4 will be described with reference to FIGS. 18 to 21.

Figure 18:
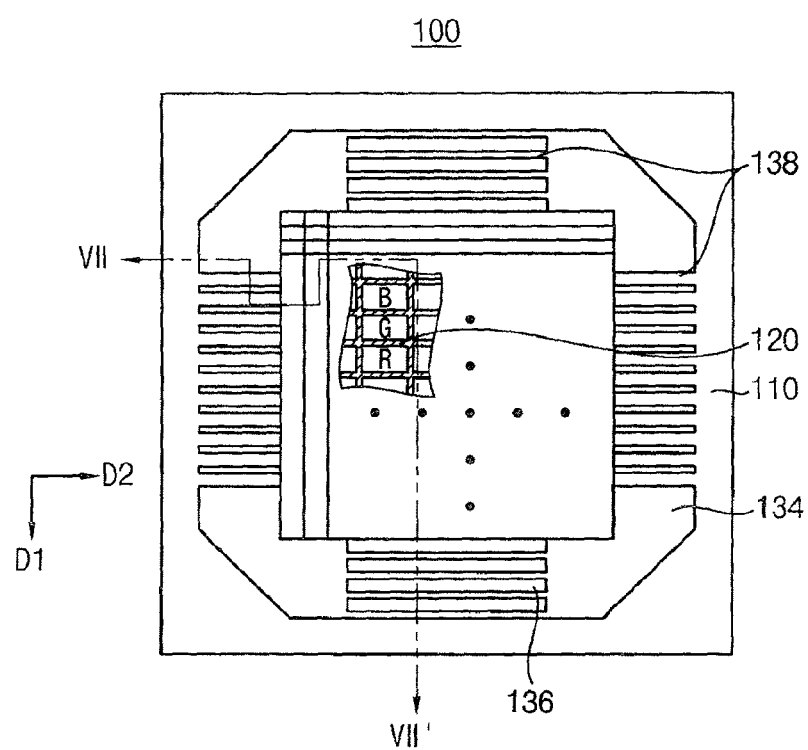
FIG. 18 is a plan view illustrating the color filter substrate for describing steps of forming the first dummy pattern and the first color bar patterns of FIG. 16.
Figure 19:
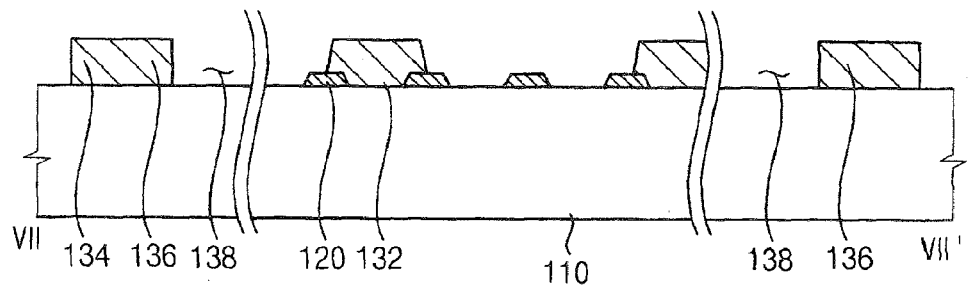
FIG. 19 is a cross-sectional view taken along a line VII-VII' of FIG. 18.

FIG. 18 is a plan view illustrating the color filter substrate for describing steps of forming the first dummy pattern and the first color bar patterns of FIG. 16. FIG. 19 is a cross-sectional view taken along a line VII-VII' of FIG. 18.

Referring to FIGS. 18 and 19, a first color photoresist layer (not shown) is formed on the first base substrate 110 including the black matrix pattern 120 and the first color photoresist layer is patterned to form the first color filter 132, the first dummy pattern 134 and the first color bar patterns 136. The first color bar patterns 136 may be formed in the first peripheral area PA1 with a pattern substantially the same as a pattern of the first color filter 132. The first color bar patterns 136 adjacent to each other may be spaced apart at a predetermined distance by an open portion 138. The first base substrate 110 may be exposed to a space between the first color bar patterns 136 through the open portion 138. The first color bar patterns 136 disposed in the second direction of the first display area DA1 may be connected to the first color filter 132.

Figure 20:
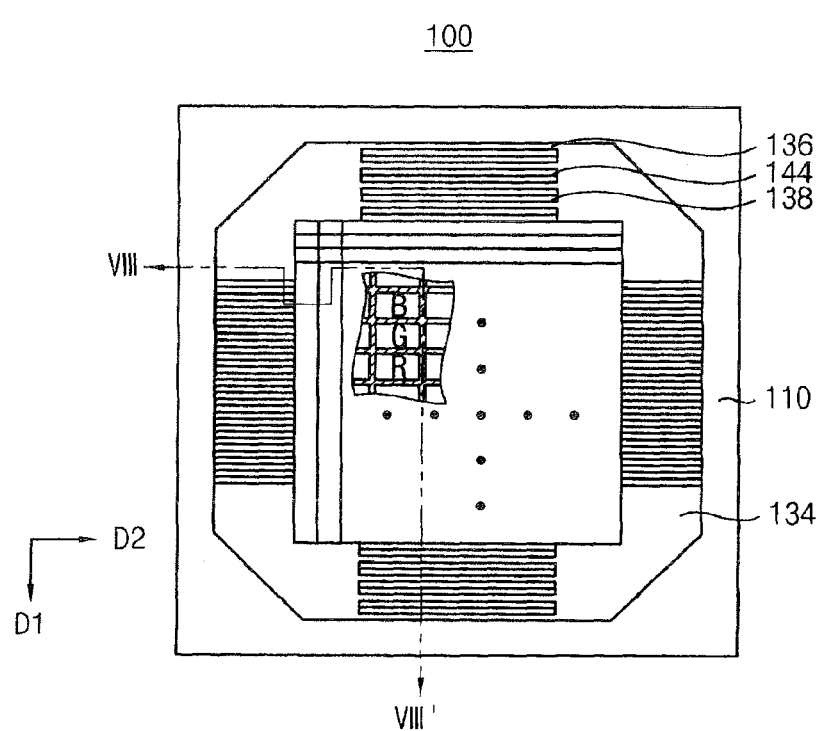
FIG. 20 is a plan view illustrating the color filter substrate for describing steps of forming the second color bar patterns.
Figure 21:
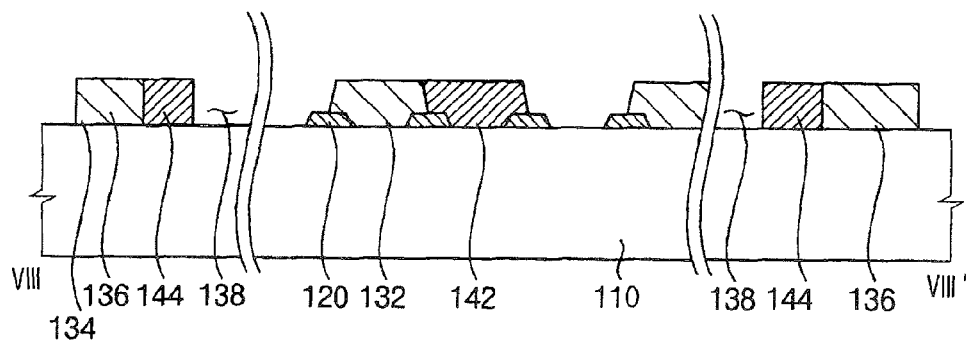
FIG. 21 is a cross-sectional view taken along a line VIII-VIII' of FIG. 20.

FIG. 20 is a plan view illustrating the color filter substrate for describing steps of forming the second color bar patterns. FIG. 21 is a cross-sectional view taken along a line VIII-VIII' of FIG. 20.

Referring to FIGS. 20 and 21, a second color photoresist layer (not shown) is formed on the first base substrate 110 on which the first color filter 132, the first dummy pattern 134, and the first color bar pattern 136 is formed. The second color photoresist layer may be formed by a spin-coating of a color photoresist. The second color photoresist layer may be uniformly coated on a front surface of the first base substrate 110 by the first dummy pattern 134.

The second color photoresist layer is patterned to form the second color filter 142 and the second color bar patterns 144. The second color filter 142 may be formed adjacently to the first color filter 132. The second color bar patterns 144 may be formed between each of the first color bar patterns 136. That is, the second color bar patterns 144 may be formed in a portion of the open portion 138 to fill the portion of the open portion 138.

A third color photoresist layer (not shown) is formed on the first base substrate 110 on which the second color bar pattern 144 are formed. The third color photoresist layer may be uniformly coated on the front surface of the first base substrate 110 by the first dummy pattern 134. The third color photoresist layer is patterned to form the third color filter 152 and the third color bar patterns 154. The third color bar patterns 154 may be respectively formed adjacently to the second color bar patterns 144. That is, the third color bar patterns 154 may be formed in a remaining portion of the open portion 138 to completely fill the open portion 138. Therefore, the color filter pattern CFP including the second dummy pattern DMP having the first to third color bar patterns 136, 144, and 154 and the first to third color filters 132, 142, and 152.

Steps for forming the overcoating layer 160 and the common electrode layer CE on the first base substrate 110 on which the first and second dummy patterns 134 and DMP are formed are substantially the same as the steps described in the method of manufacturing the color filter substrate according to Example Embodiment 1. Thus, a detailed description will be omitted.

According to the present example embodiment, the second color filter 142 and the third color filter 152 may be uniformly formed by the first dummy pattern 134. Therefore, the reliability of a color filter manufacturing process may be improved, the reliability of the color filter may be improved, and the generation of stain defects having a radial shape may be prevented, so that display quality may be improved.

Example Embodiment 5

Figure 22:
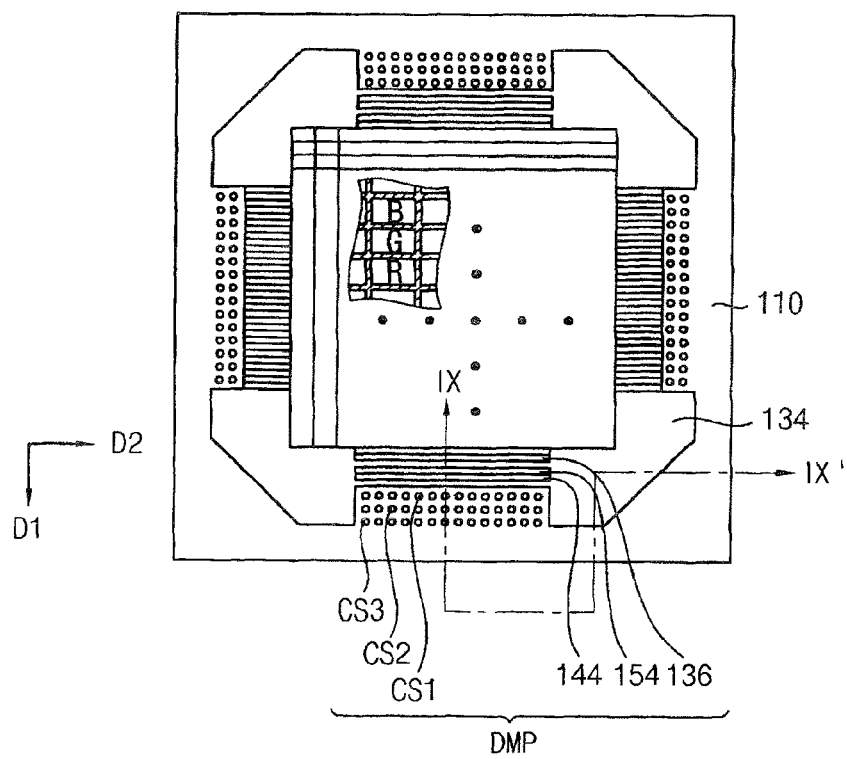
FIG. 22 is a plan view illustrating a color filter substrate according to Embodiment 5 of the present invention.
Figure 23:
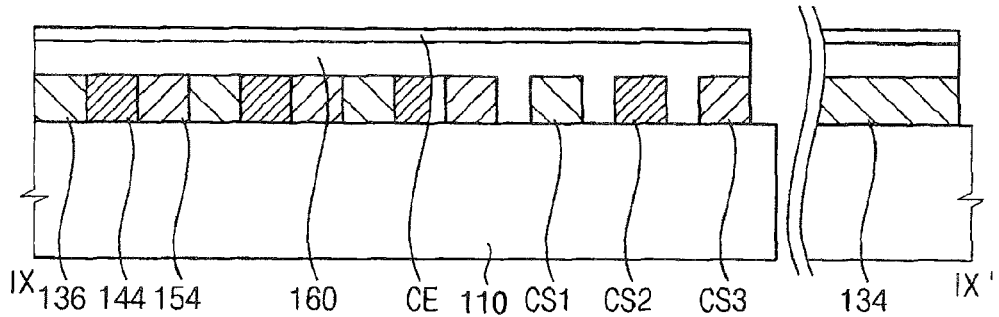
FIG. 23 is a cross-sectional view taken along a line IX-IX' of FIG. 22.

FIG. 22 is a plan view illustrating a color filter substrate according to Example Embodiment 5 of the present invention. FIG. 23 is a cross-sectional view taken along a line IX-IX' of FIG. 22.

The color filter substrate illustrated in FIG. 22 and FIG. 23 according to Example Embodiment 5 is substantially the same as the color filter substrate according to Example Embodiment 4 except for at least the second dummy pattern. Thus, a detailed description will be omitted.

Referring to FIGS. 22 and 23, the color filter substrate 100 according to Example Embodiment 5 includes a first base substrate 110, a black matrix pattern 120, a color filter pattern CFP including a first color filter 132, a second color filter 142 and a third color filter 152, a first dummy pattern 134 and a second dummy pattern DMP. The color filter substrate 100 may further include an overcoating layer 160 and a common electrode layer CE. Moreover, the color filter substrate 100 may further include an alignment layer (not shown) formed on the common electrode layer CE. The black matrix pattern 120 and the color filter pattern CFP are formed in a first display area DA1 of the first base substrate 110.

The second dummy pattern DMP is formed in the first peripheral area PA1 corresponding to a side of the first display area DA1, and the second dummy pattern DMP has a color substantially the same as the color of the color filter pattern CFP. The second dummy pattern DMP may include first color bar patterns 136, second color bar patterns 144, third color bar patterns 154, first color dot patterns CS1, second color dot patterns CS2 and third color dot patterns CS3. The first color bar patterns 136 and the first color dot patterns CS1 may be formed by patterning a color photoresist layer forming the first dummy pattern 134. The second color bar patterns 144 and the second color dot patterns CS2 may be formed by patterning a color photoresist layer forming the second color filter 142. The third color bar patterns 154 and the third color dot patterns CS3 may be formed by patterning a color photoresist layer forming the third color filter 152.

The first color bar patterns 136 are disposed in a first direction D1 of the first base substrate 110 in parallel. The second color bar patterns 144 and the third color bar patterns 154 may be disposed in the first direction D1 in parallel. Moreover, the first color bar patterns 136 are extended to a second direction D2 different from the first direction D1. The second color bar patterns 144 and the third color bar patterns 154 may be extended to the second direction D2.

The first color dot patterns CS1 are disposed in a row in the second direction D2. That is, the first color dot patterns CS1 disposed in the second direction D2 may form a row. A row formed by the second color dot patterns CS2 disposed in the second direction D2 may be substantially parallel with the row formed by the first color dot patterns CS1 disposed in the second direction D2.

In a process for forming the color filter pattern CFP, the second and third color filters 142 and 152 may be uniformly formed on the first base substrate 110 on which the first color filter 132 is formed. Therefore, the first dummy pattern 134 may increase the reliability of manufacturing the second and third color filters 142 and 152.

Figure 24:
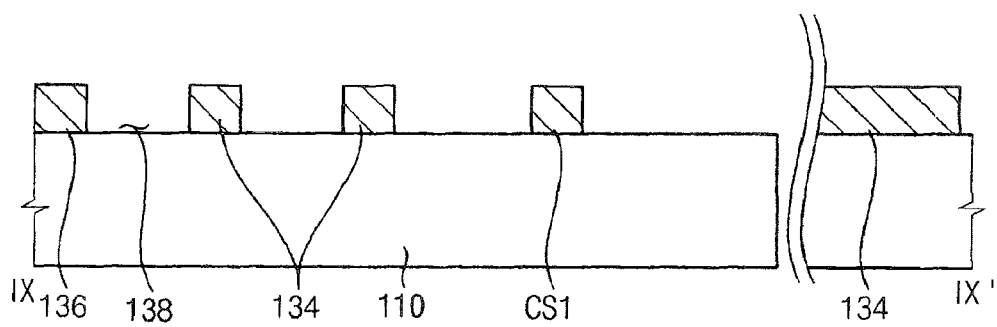
FIG. 24 is a cross-sectional view illustrating the color filter substrate for describing steps of forming the first dummy pattern and the first color dot patterns.

FIG. 24 is a cross-sectional view illustrating the color filter substrate for describing steps of forming the first dummy pattern and the first color dot patterns.

Referring to FIG. 24, a first color photoresist layer (not shown) is formed on the first base substrate 110 on which the black matrix pattern 120 is formed, and the first color photoresist layer is patterned to form the first color filter 132, the first dummy pattern 134, the first color bar patterns 136, and the first color dot patterns CS1.

The first color filter 132 is formed in the first display area DA1. The first dummy pattern 134, the first color bar patterns 136, and the first color dot patterns CS1 are formed in the first peripheral area PA1. The first color bar patterns 136 may be formed in the first peripheral area PA1 by using the pattern forming the first color filter 132. The first color bar patterns 136 may be spaced apart from each other. An open portion 138 may be defined by the first color bar patterns 136. The first color dot patterns CS1 may be disposed in the second direction D2.

Figure 25:
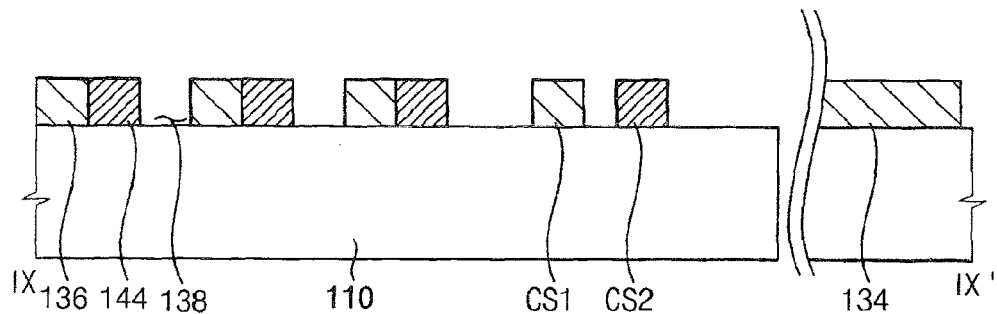
FIG. 25 is a cross-sectional view illustrating the color filter substrate for describing steps of forming the second color dot patterns of FIG. 22.

FIG. 25 is a cross-sectional view illustrating the color filter substrate for describing steps of forming the second color dot patterns of FIG. 22.

Referring to FIG. 25, a second color photoresist layer (not shown) is formed on the first base substrate 110 including the first color filter 132, the first dummy pattern 134, the first color bar pattern 136 and the first color dot patterns CS1. The second color photoresist layer may be formed by a spin-coating of a color photoresist. The second color photoresist layer may be uniformly coated on a front surface of the first base substrate 110 by the first dummy pattern 134.

The second color photoresist layer is patterned to form the second color filter 142, the second color bar patterns 144, and the second color dot patterns CS2. The second color filter 142 may be formed adjacently to the first color filter 132. The second color bar patterns 144 may be formed between each of the first color bar patterns 136. That is, the second color bar patterns 144 may be formed in a portion of the open portion 138 to fill the portion of the open portion 138.

A third color photoresist layer (not shown) is formed on the first base substrate 110 on which the second color bar pattern 144 and the second color dot patterns CS2 are formed. The third color photoresist layer may be uniformly coated on the front surface of the first base substrate 110 by the first dummy pattern 134. The third color photoresist layer is patterned to form the third color filter 152, the third color bar patterns 154, and the third color dot patterns CS3. The third color bar patterns 154 are formed in a remaining portion of the open portion 138 to completely fill the open portion 138. Therefore, the color filter pattern CFP including the second dummy pattern DMP having the first to third color bar patterns 136, 144, and 154 and the first to third color dot patterns CS1, CS2, and CS3 and the first to third color filters 132, 142, and 152.

Steps for forming the overcoating layer 160 and the common electrode layer CE on the first base substrate 110 on which the first and second dummy patterns 134 and DMP are formed are substantially the same as the steps described in the method of manufacturing the color filter substrate according to Example Embodiment 1. Thus, a detailed description will be omitted.

According to the present example embodiment, the second color filter 142 and the third color filter 152 may be uniformly formed by the first dummy pattern 134. Therefore, the reliability of a color filter manufacturing process may be improved, the reliability of the color filter may be improved, and the generation of stain defects having a radial shape may be prevented, so that display quality may be improved.

The present invention may be used in manufacturing a color filter substrate including no less than two color filters. In a process of forming a first color filter, a dummy pattern is formed in a peripheral area surrounding a display area, so that a second color filter and a third color filter may be uniformly formed after forming the first color filter. Therefore, the reliability of a color filter manufacturing process may be improved and the generation of stain defects having a radial shape may be prevented, so that display quality may be improved.

The foregoing is illustrative of the present teachings and is not to be construed as limiting thereof. Although a few example embodiments in accordance with the present disclosure of invention have been described, those skilled in the art will readily appreciate in light of the foregoing that many modifications are possible in the example embodiments without materially departing from the novel teachings and advantages of the present disclosure of invention. Accordingly, all such modifications are intended to be included within the scope of the present teachings. In the claims, means-plus-function clauses are intended to cover the structures described herein as performing the recited function and not only structural equivalents but also functionally equivalent structures. Therefore, it is to be understood that the foregoing is illustrative of the present disclosure of invention and is not to be construed as limited to the specific example embodiments disclosed, and that modifications to the disclosed example embodiments, as well as other example embodiments, are intended to be included within the scope of the present teachings.

What is claimed is:

1. A color filter substrate comprising:
   a base substrate;
   a first color filter disposed on the base substrate, the first color filter being formed in a display area that corresponds to an electrically-controlled image displaying display area, the first color filter having a first color;
   a first dummy pattern disposed on the base substrate, and formed in an image non-displaying peripheral area surrounding the display area, the first dummy pattern having the first color; and
   a second color filter disposed on the base substrate, formed in the display area, and having a second color different from the first color;
   wherein the display area has a polygon shape, the first dummy pattern defines there-within a major first opening with a first shape that conforms to and surrounds the polygon shape of the display area and where the first dummy pattern substantially defines for itself an outer boundary with a second shape that is different from the first shape.

2. The color filter substrate of claim 1, wherein the first dummy pattern has a looped curve shape surrounding the display area.

3. The color filter substrate of claim 1, wherein the thickness of the first dummy pattern is substantially equal to the thickness of the first color filter and the second color filter.

4. The color filter substrate of claim 1, wherein the thickness of the first dummy pattern is substantially thinner than the thickness of the first color filter and the second color filter.

5. The color filter substrate of claim 1, wherein the first dummy pattern is formed adjacent to the display area.

6. The color filter substrate of claim 5, wherein the first dummy pattern has a stepped portion with heights different from each other.

7. The color filter substrate of claim 1, further comprising:
   a second dummy pattern being disposed in the peripheral area corresponding to a side of the display area, the second dummy pattern having the second color.

8. The color filter substrate of claim 7, wherein the second dummy pattern comprises a plurality of color bar patterns having the second color.

9. The color filter substrate of claim 8, wherein the second dummy pattern further comprises a plurality of color dot patterns having the second color.

10. The color filter substrate of claim 1, wherein the first dummy pattern has a blue color.

11. The color filter substrate of claim 1, wherein the first dummy pattern has a chamfered edge portion.

* * * * *